(12) United States Patent
Kobayashi et al.

(10) Patent No.: US 9,796,866 B2
(45) Date of Patent: Oct. 24, 2017

(54) ELECTROCONDUCTIVE PASTE

(71) Applicant: SEKISUI CHEMICAL CO., LTD., Osaka (JP)

(72) Inventors: Hiroko Kobayashi, Shiga (JP); Kenji Yamauchi, Shiga (JP); Shintaro Moriguchi, Shiga (JP); Jiro Miyai, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/124,442

(22) PCT Filed: Mar. 16, 2015

(86) PCT No.: PCT/JP2015/057692
§ 371 (c)(1),
(2) Date: Sep. 8, 2016

(87) PCT Pub. No.: WO2015/141623
PCT Pub. Date: Sep. 24, 2015

(65) Prior Publication Data
US 2017/0037271 A1 Feb. 9, 2017

(30) Foreign Application Priority Data

Mar. 20, 2014 (JP) .................................. 2014-058688
Sep. 30, 2014 (JP) .................................. 2014-202342

(51) Int. Cl.
*H01B 1/22* (2006.01)
*C09D 11/52* (2014.01)
(Continued)

(52) U.S. Cl.
CPC ................ *C09D 11/52* (2013.01); *C08K 3/08* (2013.01); *C09D 11/033* (2013.01);
(Continued)

(58) Field of Classification Search
CPC C08K 2003/0862; C08K 3/08; C09D 11/033; C09D 11/106; C09D 11/52;
(Continued)

(56) References Cited

U.S. PATENT DOCUMENTS

2007/0293651 A1 12/2007 Tada et al.
2011/0141654 A1 6/2011 Okada
(Continued)

FOREIGN PATENT DOCUMENTS

CN 1993387 7/2007
CN 103124748 5/2013
(Continued)

OTHER PUBLICATIONS

"Alpha-Terpinyl Acetate", National Center for Biotechnology Information. PubChem Compound Database; CID=111037, https://pubchem.ncbi.nlm.nih.gov/compound/111037 Mar. 27, 2005.*
(Continued)

*Primary Examiner* — Mark Kopec
*Assistant Examiner* — Jaison P Thomas
(74) *Attorney, Agent, or Firm* — Wenderoth, Lind & Ponack, L.L.P.

(57) ABSTRACT

The present invention provides a conductive paste that has excellent printability, that can provide a printed electrode with a smooth surface, and that is excellent in storage stability. The present invention relates to a conductive paste used for formation of an electrode of a multilayer ceramic capacitor, the conductive paste including: a polyvinyl acetal resin that contains a carboxylic acid-modified polyvinyl acetal resin; an organic solvent; and a conductive powder, the polyvinyl acetal resin having an average degree of polymerization of 200 to 800, an carboxyl group content of 0.05 to 1 mol %, a hydroxy group content of 16 to 24 mol %, an acetyl group content of 0.1 to 3 mol %, and an acetoacetal group content of not more than 25 mol %, the carboxylic acid-modified polyvinyl acetal resin having at least one of a structural unit that has a carboxyl group represented by the formula (1-1) and a structural unit that has a carboxyl group represented by the formula (1-2):

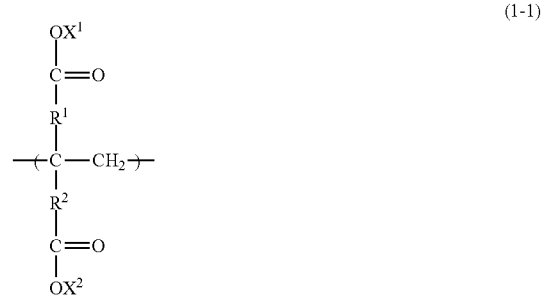

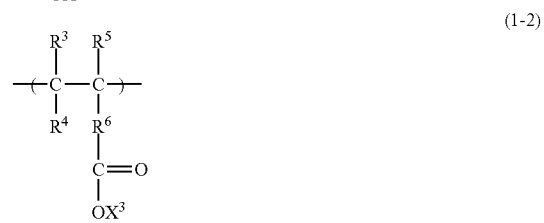

in the formula (1-1), $R^1$ and $R^2$ each independently representing a C0-C10 alkylene group, $X^1$ and $X^2$ each independently representing a hydrogen atom, a metal atom, or a methyl group, in the formula (1-2), $R^3$, $R^4$, and $R^5$ each independently representing a hydrogen atom or a C1-C10 alkyl group, $R^6$ representing a C0-C10 alkylene group, $X^3$ representing a hydrogen atom, a metal atom, or a methyl group.

6 Claims, No Drawings

(51) Int. Cl.
  *H01G 4/008* (2006.01)
  *C08K 3/08* (2006.01)
  *C09D 11/033* (2014.01)
  *C09D 11/106* (2014.01)
  *C09D 131/04* (2006.01)
  *H01G 4/12* (2006.01)
  *H01G 4/30* (2006.01)

(52) U.S. Cl.
  CPC .......... *C09D 11/106* (2013.01); *C09D 131/04* (2013.01); *H01B 1/22* (2013.01); *H01G 4/008* (2013.01); *C08K 2003/0862* (2013.01); *H01G 4/12* (2013.01); *H01G 4/30* (2013.01)

(58) Field of Classification Search
  CPC ........ C09D 131/04; H01B 1/22; H01G 4/008; H01G 4/12; H01G 4/30
  See application file for complete search history.

(56) References Cited

U.S. PATENT DOCUMENTS

2013/0197154 A1   8/2013   Yamaguchi et al.
2013/0225741 A1   8/2013   Ootsuki
2014/0018488 A1   1/2014   Kawagoe et al.
2015/0098165 A1   4/2015   Suzuki et al.

FOREIGN PATENT DOCUMENTS

| | | |
|---|---|---|
| JP | 2005-116504 | 4/2005 |
| JP | 2005-243561 | 9/2005 |
| JP | 2012-216488 | 11/2012 |
| JP | 2013-73689 | 4/2013 |
| JP | 2013-187022 | 9/2013 |
| TW | 201245233 | 11/2012 |
| TW | 201331956 | 8/2013 |
| TW | 201344704 | 11/2013 |
| WO | 2010/021202 | 2/2010 |
| WO | 2012/043273 | 4/2012 |
| WO | 2013/187183 | 12/2013 |

OTHER PUBLICATIONS

International Search Report dated Jun. 2, 2015 in corresponding International Application No. PCT/JP2015/057692.

\* cited by examiner

ELECTROCONDUCTIVE PASTE

TECHNICAL FIELD

The present invention relates to a conductive paste excellent in surface smoothness after printing.

BACKGROUND ART

Electronic components used in various electronic devices have recently been down-sized and multilayered, leading to a wide use of multilayer-type electronic components such as multilayer circuit boards, multilayer coils, and multilayer ceramic capacitors.

Multilayer ceramic capacitors, for example, are commonly produced by the following procedure. First, a solution of a binder resin, such as polyvinyl butyral resin, poly(meth)acrylic ester resin, or ethyl cellulose, in an organic solvent is blended with a plasticizer, a dispersant, or the like. The mixture is then blended with a ceramic raw material powder to give a ceramic slurry. Next, the ceramic slurry is casted on a surface of a supporting member preliminary subjected to a mold-release treatment. After removal of a volatile content, such as the organic solvent, by heating or the like, the resulting product is peeled from the supporting member to provide a ceramic green sheet.

To the ceramic green sheet, a conductive paste is applied by screen-printing for formation of an internal electrode. A plurality of such sheets are piled, and thermocompressed to give a lamination. Then, the lamination is subjected to a treatment for removing the binder resin contained therein by pyrolysis, namely, the lamination is degreased. The resulting lamination is fired to give a ceramic sintered body. On end faces of the ceramic sintered body, external electrodes are formed, thereby producing a multilayer ceramic capacitor.

A thinner internal electrode with a smoother surface is now demanded to be used in a smaller and higher-capacity multilayer ceramic capacitor. As a conductive paste for forming a thin and smooth internal electrode, for example, Patent Literature 1 discloses a conductive paste in which the particle size of a metal material is controlled so that the resulting electrode has a smooth surface.

However, the smoothness needs to be further improved in a recently desired thinner electrode layer. Even in the case where the particle size of a metal material to be used is controlled, if the metal material is not mixed well with other constituent materials of the conductive paste, such as an organic solvent or a binder resin, the dispersibility thereof is not enough, so as to hardly providing a printed electrode with a smooth surface.

Patent Literature 2 discloses use of a low-polarity organic solvent for preventing sheet attack against a ceramic green sheet.

However, a conventional polyvinyl acetal resin used as a binder of a conductive paste is hardly dissolved in the above-mentioned low-polarity organic solvent because of poor solubility of the polyvinyl acetal resin in the organic solvent derived from their difference in polarity, though the polyvinyl acetal resin, which can prevent delamination (interlayer peeling), is effectively used for preparation of a thinner electrode. The use of a conventional polyvinyl acetal resin in an electrode paste therefore lowers the dispersibility of inorganic powder to roughen the surface of a printed electrode, leading to difficulty in achieving smoothness.

As another problem, storage of a conventional conductive paste for a long time changes its viscosity, and such a paste is hard to use in the printing process.

CITATION LIST

Patent Literature

Patent Literature 1: WO 2010/021202
Patent Literature 2: JP 2005-243561 A

SUMMARY OF INVENTION

Technical Problem

The present invention aims to provide a conductive paste which has excellent printability, which can provide a printed electrode with a smooth surface, and which is excellent in storage stability and viscosity stability.

Solution to Problem

The present invention relates to a conductive paste used for formation of an electrode of a multilayer ceramic capacitor, the conductive paste including: a polyvinyl acetal resin that contains a carboxylic acid-modified polyvinyl acetal resin; an organic solvent; and a conductive powder, the polyvinyl acetal resin having an average degree of polymerization of 200 to 800, an carboxyl group content of 0.05 to 1 mol %, a hydroxy group content of 16 to 24 mol %, an acetyl group content of 0.1 to 3 mol %, and an acetoacetal group content of not more than 25 mol %, the carboxylic acid-modified polyvinyl acetal resin having at least one of a structural unit that has a carboxyl group represented by the formula (1-1) and a structural unit that has a carboxyl group represented by the formula (1-2):

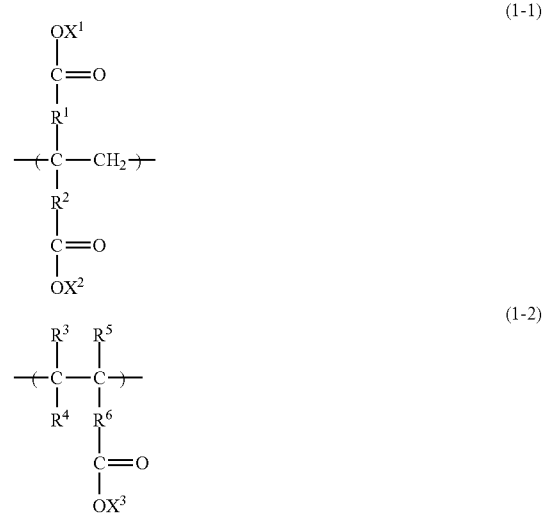

in the formula (1-1), $R^1$ and $R^2$ each independently representing a C0-C10 alkylene group, $X^1$ and $X^2$ each independently representing a hydrogen atom, a metal atom, or a methyl group, in the formula (1-2), $R^3$, $R^4$, and $R^5$ each independently representing a hydrogen atom or a C1-C10 alkyl group, $R^6$ representing a C0-C10 alkylene group, $X^3$ representing a hydrogen atom, a metal atom, or a methyl group. The state where an alkylene group has a carbon number of 0 refers to state where carbons adjacent to $R^1$, $R^2$, or $R^6$ are directly bonded to each other.

The present invention is specifically described in the following.

The present inventors made an intensive study to obtain the following new findings: smoothness of the surface of a printed electrode can be achieved by using a polyvinyl acetal resin that contains a carboxylic acid-modified polyvinyl acetal resin having a specific structure as a binder resin of a conductive paste and controlling the average degree of polymerization, the carboxyl group content, the hydroxy group content, the acetyl group content, and the acetoacetal group content of the polyvinyl acetal resin each within a predetermined range. The present invention was completed based on such findings.

The conductive paste of the present invention contains a polyvinyl acetal resin.

The polyvinyl acetal resin contains a carboxylic acid-modified polyvinyl acetal resin having a specific structure. The carboxylic acid-modified polyvinyl acetal resin as used herein refers to a resin that has a structural unit having a carboxyl group, in addition to a structural unit having an acetyl group represented by the formula (2-1), a structural unit having a hydroxy group represented by the formula (2-2), and a structural unit having an acetal group represented by the formula (2-3).

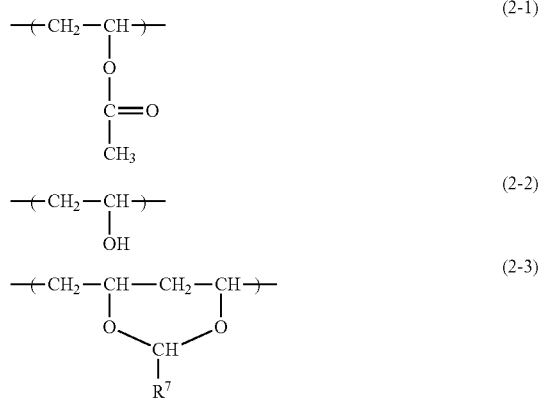

In the formula (2-3), $R^7$ represents a hydrogen atom or a C1-C20 alkyl group.

The carboxylic acid-modified polyvinyl acetal resin has at least one of the structural unit represented by the formula (1-1) and the structural unit represented by the formula (1-2).

In the conductive paste of the present invention, a carboxylic acid-modified polyvinyl acetal resin having the above structural unit is used as a binder resin, and therefore, the binder resin can be dissolved in a low-polarity organic solvent and has better compatibility with conductive powder that is a constituent material of the conductive paste. As a result, a smooth surface of a printed electrode can be achieved.

The carboxylic acid-modified polyvinyl acetal resin preferably has a structural unit represented by the formula (1-1). Having a structural unit represented by the formula (1-1) in which two carboxyl groups are present at positions sandwiching carbon of the main chain, the carboxylic acid-modified polyvinyl acetal resin may have an appropriate interaction with conductive powder in a conductive paste to be obtained and also improves the storage stability of the conductive paste.

In the formula (1-1), $R^1$ and $R^2$ each independently represent a C0-C10 alkylene group, and $X^1$ and $X^2$ each independently represent a hydrogen atom, a metal atom, or a methyl group.

In the formula (1-1), if the alkylene group represented by $R^1$ and $R^2$ has a carbon number of more than 10, carboxyl groups tend to cause agglomeration, so that the carboxylic acid-modified polyvinyl acetal resin is less likely to be dissolved in a low-polarity solvent. The lower limit of the carbon number of the alkylene group represented by $R^1$ and $R^2$ is preferably 0, and the upper limit thereof is preferably 5. The lower limit is more preferably 1 and the upper limit is more preferably 3.

$R^1$ and $R^2$ may be the same as or different from each other, and are preferably different from each other. Preferably, at least one of them is a C0 alkylene group.

Examples of the C0-C10 alkylene group include C0 alkylene groups; linear alkylene groups such as methylene, ethylene, trimethylene, tetramethylene, pentamethylene, hexamethylene, octamethylene, and decamethylene groups; branched alkylene groups such as methylmethylene, methylethylene, 1-methylpentylene, and 1,4-dimethylbutylene groups; and cyclic alkylene groups such as cyclopropylene, cyclobutylene, and cyclohexylene groups. Preferred among these are C0 alkylene and linear alkyl groups such as methylene, ethylene, n-propylene, and n-butylene groups. More preferred are C0 alkylene, methylene, and ethylene groups.

In the case where at least one of $X^1$ and $X^2$ represents a metal atom, examples of the metal atom include sodium, lithium, and potassium atoms. Preferred among these is a sodium atom.

The structural unit represented by the formula (1-1) is preferably derived from an α-dicarboxy monomer. Examples of the α-dicarboxy monomer include: dicarboxylic acids having a radical polymerizable unsaturated double bond such as methylenemalonic acid, itaconic acid, 2-methyleneglutaric acid, 2-methyleneadipic acid, and 2-methylenesebacic acid; and metal salts or methyl esters thereof. Preferred among these is itaconic acid.

The α-dicarboxy monomer as used herein refers to a monomer having two carboxyl groups at an α-carbon.

In the formula (1-2), $R^3$, $R^4$, and $R^5$ each independently represent a hydrogen atom or a C1-C10 alkyl group, $R^6$ represents a C0-C10 alkylene group, and $X^3$ represents a hydrogen atom, a metal atom, or a methyl group.

In the formula (1-2), if the carbon number of the alkyl group exceeds 10, steric hindrance is caused so that polymerization is less likely to proceed upon synthesis of raw materials. The lower limit of the carbon number of the alkyl group represented by $R^3$, $R^4$, and $R^5$ is preferably 1 and the upper limit thereof is 5. The upper limit is more preferably 3.

$R^3$ and $R^4$ may be the same as or different from each other, and are preferably the same as each other. $R^3$, $R^4$, and $R^5$ are each preferably a hydrogen atom.

Examples of the C1-C10 alkyl group include: linear alkyl groups such as methyl, ethyl, propyl, n-butyl, n-pentyl, n-heptyl, n-octyl, n-nonyl, and n-decyl groups; branched alkyl groups such as isopropyl, isobutyl, sec-butyl, tert-butyl, isopentyl, 2,2-dimethylpropyl, 1,1,3,3-tetramethylbutyl, and 2-ethylhexyl groups; and cycloalkyl groups such as cyclopropyl, cyclopropylmethyl, cyclobutyl, cyclopentyl, and cyclohexyl groups. Preferred among these are linear alkyl groups such as methyl, ethyl, propyl, and n-butyl groups, and more preferred are methyl and ethyl groups.

In the formula (1-2), if the carbon number of the alkylene group represented by $R^6$ exceeds 10, carboxyl groups tend to cause agglomeration, so that the resin is less likely to be dissolved in a low-polarity solvent. The lower limit of the carbon number of the alkylene group represented by $R^6$ is preferably 0, and the upper limit thereof is preferably 5. The lower limit is more preferably 1, and the upper limit is more preferably 3.

Examples of $R^6$ in the formula (1-2) include those mentioned for $R^1$ and $R^2$ in the formula (1-1). Preferred among these are C-0 alkylene groups, and linear alkylene groups such as methylene, ethylene, n-propylene, and n-butylene groups. More preferred are C-0 alkylene, methylene, and ethylene groups, and still more preferred is C-0 alkylene groups.

In the case where $X^3$ represents a metal atom, examples of the metal atom include sodium, lithium, and potassium atoms. Preferred among these is a sodium atom.

The structural unit represented by the formula (1-2) is preferably derived from a monocarboxy monomer. Examples of the monocarboxy monomer include: monocarboxylic acids having a radical polymerizable unsaturated double bond, such as acrylic acid, crotonic acid, methacrylic acid, and oleic acid; and metal salts or methyl esters thereof. Preferred among these is crotonic acid.

These carboxylic acid-modified polyvinyl acetal resins having a specific structure may be used alone, or in combination of different ones.

The carboxylic acid-modified polyvinyl acetal resin having a specific structure may be synthesized by any method. In the case where the carboxylic acid-modified polyvinyl acetal resin has a structural unit represented by the formula (1-1), for example, an α-dicarboxy monomer that is to be a structural unit represented by the formula (1-1) and vinyl acetate are copolymerized to give polyvinyl acetate. The polyvinyl acetate is then saponified to give a polyvinyl alcohol resin, and the polyvinyl alcohol resin is acetalized by a conventionally known method. In particular, the α-dicarboxy monomer used in preparation of polyvinyl acetate by copolymerization is preferably methyl ester because acetyl groups derived from vinyl acetate are not hydrolyzed before saponification, so that the polyvinyl alcohol resin prepared in the subsequent saponification step is more highly saponified. Moreover, since the amount of sodium hydroxide added in the saponification step can be reduced, the sodium ion content of the polyvinyl alcohol resin, eventually of the carboxylic acid-modified polyvinyl acetal resin can be lowered.

Also in the case where the α-dicarboxy monomer is methyl ester, hydrolysis occurs in the subsequent saponification step, and therefore, the polyvinyl alcohol resin to be obtained has a carboxylic acid unit containing no ester.

In the case where the α-dicarboxy monomer that is to be a structural unit represented by the formula (1-1) is a monomer in which $X^1$ and $X^2$ each represent a hydrogen atom or a metal atom, the amount of sodium hydroxide consumed in the hydrolysis of vinyl acetate-derived acetyl groups during saponification increases, and therefore, the carboxylic acid-modified polyvinyl acetal resin to be obtained may have a relatively large sodium ion content.

In the case where the carboxylic acid-modified polyvinyl acetal resin has a structural unit represented by the formula (1-2), for example, a monocarboxy monomer that is to be a structural unit represented by the formula (1-2) and vinyl acetate are copolymerized to give polyvinyl acetate. The polyvinyl acetate is then saponified to give a polyvinyl alcohol resin, and the polyvinyl alcohol resin is acetalized by a conventionally known method. For another example, a polyvinyl alcohol resin is reacted with a compound having a carboxyl group, such as mercaptopropionic acid, and then modified to give a carboxylic acid-modified polyvinyl alcohol resin, and the carboxylic acid-modified polyvinyl alcohol resin is acetalized by a conventionally known method.

The acetalization reaction is not particularly limited, and may be carried out by a conventionally known method. For example, an aldehyde is added in the presence of an acid catalyst to an aqueous solution, alcohol solution, water/alcohol mixed solution, or solution in dimethyl sulfoxide (DMSO) of polyvinyl alcohol.

The aldehyde is not particularly limited, and examples thereof include formaldehyde, acetaldehyde, propionaldehyde, butyraldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. Among these aldehydes, preferred is use of butyraldehyde singly or combination use of acetaldehyde and butyraldehyde.

The polyvinyl acetal resin may contain, in addition to the carboxylic acid-modified polyvinyl acetal resin, another polyvinyl acetal resin such as unmodified polyvinyl acetal resins within a range that the effect of the present invention is not impaired.

In the case where the polyvinyl acetal resin contains another polyvinyl acetal resin such as unmodified polyvinyl acetal resins, the amount of the carboxylic acid-modified polyvinyl acetal resin in the polyvinyl acetal resin is not particularly limited as long as the later-described carboxyl group content of the polyvinyl acetal resin can be achieved. The lower limit of the amount is preferably 5% by weight, and the upper limit thereof is preferably 90% by weight. The lower limit is more preferably 10% by weight, and the upper limit is more preferably 85% by weight. The lower limit is particularly preferably 15% by weight, and the upper limit is particularly preferably 80% by weight.

The lower limit of the average degree of polymerization of the polyvinyl acetal resin is 200, and the upper limit thereof is 800. If the average degree of polymerization is less than 200, the conductive paste has a lower viscosity to have lower printability or storage stability. If the average degree of polymerization exceeds 800, the solubility of the polyvinyl acetal resin in an organic solvent is lowered so that the conductive paste tends to be stringy to have lower printability, resulting in poor surface smoothness. The lower limit of the average degree of polymerization of the polyvinyl acetal resin is preferably 250, and the upper limit thereof is preferably 700. The lower limit is more preferably 300, and the upper limit is more preferably 600. The lower limit is still more preferably 330, and the upper limit is still more preferably 580.

The average degree of polymerization of the polyvinyl acetal resin herein is determined based on the average degree of polymerization of the polyvinyl alcohol as a raw material.

The average degree of polymerization of the polyvinyl acetal resin as used herein refers to the apparent average degree of polymerization of the whole polyvinyl acetal resin. Specifically, for example, in the case where the polyvinyl acetal resin contains plural resins different in the average degree of polymerization, the average degree of polymerization of the polyvinyl acetal resin can be obtained by multiplying the average degree of polymerization of each of the resins with the content ratio of the resin and summing up the obtained values.

The lower limit of the carboxyl group content of the Polyvinyl acetal resin is 0.05 mol %, and the upper limit thereof is 1 mol %. If the carboxyl group content is less than 0.05 mol %, the effect given by the polyvinyl acetal resin containing a carboxyl group is reduced so that the printability of the conductive paste is lowered to lower the surface smoothness or the storage stability of the conductive paste. If the carboxyl group content exceeds 1 mol %, the solubility of the polyvinyl acetal resin in an organic solvent is lowered and the interaction between the carboxyl group and the conductive powder becomes too strong, leading to difficulty in preparation of a conductive paste. The lower limit of the carboxyl group content of the polyvinyl acetal resin is preferably 0.07 mol %, and the upper limit thereof is preferably 0.8 mol %. The lower limit is more preferably 0.1 mol %, and the upper limit is more preferably 0.6 mol %.

The carboxyl group content of the polyvinyl acetal resin as used herein refers to the proportion of a structural unit having a carboxyl group in all of the structural units of the polyvinyl acetal resin. For example, though the structural unit represented by the formula (1-1) includes two carboxyl groups, the number of the carboxyl groups present in a single structural unit is not taken into account, and the proportion of the structural unit having a carboxyl group in all of the structural units of the polyvinyl acetal resin is referred to as the carboxyl group content.

The carboxyl group content of the polyvinyl acetal resin as used herein refers to the apparent carboxyl group content of the whole polyvinyl acetal resin. Specifically, for example, in the case where the polyvinyl acetal resin contains plural resins different in the carboxyl group content, the carboxyl group content of the polyvinyl acetal resin can be obtained by multiplying the carboxyl group content of each of the resins with the content ratio of the resin and summing up the obtained values.

In the case where the polyvinyl acetal resin contains a carboxylic acid-modified polyvinyl acetal resin and an unmodified polyvinyl acetal resin, for example, the carboxyl group content of the polyvinyl acetal resin can be calculated using the following equation (3):

$$A = B \times (C/D) \qquad (3).$$

In the equation (3), A represents the carboxyl group content (mol %) of the polyvinyl acetal resin, B represents the carboxyl group content (mol %) of the carboxylic acid-modified polyvinyl acetal resin, C represents the weight of the carboxylic acid-modified polyvinyl acetal resin, and D represents the weight of the whole polyvinyl acetal resin.

The carboxyl group content of the carboxylic acid-modified polyvinyl acetal resin (B in the equation (3)) is not particularly limited as long as the above-mentioned carboxyl group content of the polyvinyl acetal resin can be achieved. The lower limit thereof is preferably 0.03 mol %, and the upper limit thereof is preferably 4 mol %.

In the case where the polyvinyl acetal resin contains an acetoacetal group, the upper limit of the acetoacetal group content is 25 mol %. If the acetoacetal group content exceeds 25 mol %, the solubility of the polyvinyl acetal resin in a low-polarity organic solvent is lowered, leading to difficulty in preparation of a conductive paste. The upper limit of the acetoacetal group content of the polyvinyl acetal resin is preferably 22 mol %, more preferably 20 mol %.

The acetoacetal group refers to an acetal group included in the structural unit having an acetal group represented by the formula (2-3) where $R^7$ represents a methyl group. The acetoacetal group content of the polyvinyl acetal resin as used herein refers to the apparent acetoacetal group content of the whole polyvinyl acetal resin.

In the case where the polyvinyl acetal resin contains a butyral group, the lower limit of the butyral group content is preferably 40 mol %, and the upper limit thereof is preferably 80 mol %. If the butyral group content is less than 40 mol %, the residual hydroxy group content becomes too large so that the solubility of the polyvinyl acetal resin in a low-polarity solvent is lowered. If the butyral group content exceeds 80 mol %, the residual hydroxy group content becomes too small so that the conductive paste to be obtained has too low a viscosity and poor storage stability. The lower limit of the butyral group content of the polyvinyl acetal resin is more preferably 50 mol %, and the upper limit thereof is more preferably 70 mol %.

The butyral group refers to an acetal group included in the structural unit having an acetal group represented by the formula (2-3) where $R^7$ represents a propyl group. The butyral group content of the polyvinyl acetal resin as used herein refers to the apparent butyral group content of the whole polyvinyl acetal resin.

The lower limit of the hydroxy group content of the polyvinyl acetal resin is 16 mol %, and the upper limit thereof is 24 mol %. If the hydroxy group content is less than 16 mol %, conductive powder tends to agglomerate, so that the dispersibility of the conductive paste to be obtained is lowered. As a result, a printed coating may not be smooth. If the hydroxy group content exceeds 24 mol %, the solubility in a low-polarity organic solvent used in the present invention is lowered. The lower limit of the hydroxy group content of the polyvinyl acetal resin is preferably 17 mol %, and the upper limit thereof is preferably 23 mol %.

In the polyvinyl acetal resin, the lower limit of the acetyl group content is 0.1 mol %, and the upper limit thereof is 3 mol %. If the acetyl group content is less than 0.1 mol %, the acetalization reaction hardly occurs. If the acetyl group content exceeds 3 mol %, the solubility in a low-polarity organic solvent used in the present invention is lowered. The lower limit of the acetyl group content of the polyvinyl acetal resin is preferably 0.2 mol %, and the upper limit thereof is preferably 2.5 mol %.

In the polyvinyl acetal resin, the lower limit of the ratio of the acetyl group content to the hydroxy group content is preferably 0.01, and the upper limit thereof is preferably 0.15. If the ratio of the acetyl group content to the hydroxy group content is maintained within the above range, the polyvinyl acetal resin can be dissolved in a later-described low-polarity organic solvent. If the ratio of the acetyl group content to the hydroxy group content is less than 0.01 or more than 0.15, the solubility in a low-polarity organic solvent may be lowered. The lower limit of the ratio of the acetyl group content to the hydroxy group content of the polyvinyl acetal resin is more preferably 0.03, and the upper limit thereof is more preferably 0.13.

In the polyvinyl acetal resin, the total amount of the carboxyl group content, the acetal group content, the hydroxy group content, and the acetyl group content is preferably 99.1 mol % or more.

If the total amount is 99.1 mol % or more, the amount of other constitutional units is relatively reduced and the effect of the present invention can be more favorably exerted.

The polyvinyl acetal resin has a sodium ion content of preferably less than 50 ppm. If the sodium ion content of the polyvinyl acetal resin is less than 50 ppm, the conductive paste can have excellent conductivity and a significant change in the viscosity is less likely to occur over time.

The conductive paste of the present invention may contain, in addition to the polyvinyl acetal resin, other resins such as acrylic resins or ethyl cellulose within a range that the effect of the present invention is not impaired.

The polyvinyl acetal resin of the present invention has better compatibility with other resins in comparison with conventional polyvinyl acetal resins owing to the effect of the carboxyl group.

The conductive paste of the present invention contains a conductive powder.

The conductive powder is not particularly limited, and examples thereof include nickel powder, aluminum powder, silver powder, copper powder, silver salt powder, and powder of an alloy of these. These conductive powders may be used alone, or in combination of two or more thereof. Preferred among these is nickel powder because of its excellent conductivity.

The nickel powder preferably has an average particle size of 50 to 300 nm in a substantially spherical shape. If the average particle size is less than 50 nm, the nickel powder has a large specific surface area to be agglomerated, and such agglomerated nickel powder may fail to be dispersed. If the average particle size is more than 300 nm, the printed surface may not be smooth. The substantially spherical shape includes the completely spherical shape and nearly spherical shapes.

The amount of the conductive powder added is not particularly limited, and the lower limit thereof is preferably 100 parts by weight and the upper limit thereof is preferably 10000 parts by weight for 100 parts by weight of the polyvinyl acetal resin. If the amount of the conductive powder added is less than 100 parts by weight, the density of the conductive powder in the conductive paste is low so that the conductivity is lowered. If the amount of the conductive powder added is more than 10000 parts by weight, the dispersibility of the conductive powder in the conductive paste is lowered, which may reduce the printability. The lower limit of the amount of the conductive powder added is more preferably 200 parts by weight and the upper limit thereof is more preferably 5000 parts by weight for 100 parts by weight of the polyvinyl acetal resin.

The conductive paste of the present invention preferably contains, in addition to the conductive powder, a ceramic powder. Containing a ceramic powder can adjust the shrinkage behavior of the conductive powder during firing to the shrinkage behavior of ceramic green sheet.

The ceramic powder is not particularly limited, and is preferably barium titanate powder that is used in the green sheet. The particle size of the ceramic powder is not particularly limited, and is preferably smaller than the particle size of the conductive powder. Specifically, the particle size is preferably 30 to 200 nm.

The conductive paste of the present invention contains an organic solvent.

The organic solvent may be an organic solvent commonly used in a conductive paste. In particular, from the standpoint of preventing a sheet attack phenomenon, preferably, the organic solvent is a low-polarity organic solvent that is incompatible with, namely, does not swell or dissolve the polyvinyl butyral resin contained in the ceramic green sheet and has a solubility parameter of 8.0 to 11.0 $(cal/cm^3)^{0.5}$. The solubility parameter herein is calculated by the Fedors method.

Examples of the organic solvent include: terpineol derivatives such as terpinyl acetate, isobornyl acetate, dihydroterpinyl acetate, dihydroterpinyl methyl ether, and terpinyl methyl ether; hydrocarbon solvents such as mineral spirits; and ethers and esters such as dipropylene glycol monomethyl ether and dipropylene glycol monomethyl ether acetate. These organic solvents may be used alone, or in combination of two or more thereof.

The amount of the organic solvent added is not particularly limited. The lower limit thereof is preferably 100 parts by weight and the upper limit thereof is preferably 10000 parts by weight for 100 parts by weight of the polyvinyl acetal resin. If the amount of the organic solvent added is less than 100 parts by weight, the viscosity of the conductive paste may become high to lower the printability. If the amount of the organic solvent added exceeds 10000 parts by weight, the polyvinyl acetal resin in the conductive paste may exhibit its performance insufficiently. The lower limit of the amount of the organic solvent added is more preferably 200 parts by weight and the upper limit thereof is more preferably 5000 parts by weight for the 100 parts by weight of the polyvinyl acetal resin.

The conductive paste of the present invention may appropriately contain a plasticizer, a lubricant, an antistatic agent, a dispersant, a surfactant, and the like within a range that the effect of the present invention is not impaired.

The plasticizer is not particularly limited, and examples thereof include: phthalic acid diesters such as bis(2-ethylhexyl)phthalate, dioctylphthalate and dibutylphthalate; adipic acid diesters such as dioctyl adipate; and alkylene glycol diesters such as triethyleneglycol 2-ethylhexyl.

The dispersant is not particularly limited, and preferable examples thereof include fatty acids, aliphatic amines, alkanolamides, and phosphoric acid esters. A silane coupling agent may also be added.

The fatty acids are not particularly limited, and examples thereof include: saturated fatty acids such as behenic acid, stearic acid, palmitic acid, myristic acid, lauric acid, capric acid, caprylic acid, and coconut fatty acid; and unsaturated fatty acids such as oleic acid, linoleic acid, linolenic acid, sorbic acid, tallow acid, and castor hardened fatty acid. Preferred among these are lauric acid, stearic acid, and oleic acid.

The aliphatic amines are not particularly limited, and examples thereof include laurylamine, myristylamine, cetylamine, stearylamine, oleylamine, alkyl(coconut)amine, alkyl(hardened tallow)amine, alkyl(tallow)amine, and alkyl(soybean)amine.

The alkanolamides are not particularly limited, and examples thereof include coconut fatty acid diethanolamide, tallow acid diethanolamide, lauric acid diethanolamide, and oleic acid diethanolamide.

The phosphoric acid esters are not particularly limited, and examples thereof include polyoxyethylene alkyl ether phosphate and polyoxyethylene alkyl aryl ether phosphate.

The surfactant is not particularly limited. Examples of anionic surfactants include: carboxylic acid surfactants such as fatty acid sodium salt; sulfonic acid surfactants such as sodium linear alkyl benzene sulfonate, sodium lauryl sulfate, and alkyl polyoxy sulfate; and phosphoric acid surfactants such as monoalkyl phosphate. Examples of cationic surfactants include alkyl trimethyl ammonium salt, dialkyl dimethyl ammonium salt, and alkylbenzyldimethyl ammonium salt. Examples of amphoteric surfactants include alkyl dimethylamine oxide and alkyl carboxybetaine. Examples of nonionic surfactants include polyoxyethylene alkyl ether, sorbitan fatty acid ester, alkylpolyglucoside, fatty acid diethanolamide, and alkyl monoglyceryl ether.

The dispersant and surfactant also have an effect of inhibiting a rise in the viscosity of the paste or resin solution over time.

The conductive paste of the present invention may be produced by any method, for example, by mixing the polyvinyl acetal resin that contains a carboxylic acid-modified polyvinyl acetal resin, the conductive powder, the organic solvent, and optionally other components using a mixer such as a ball mill, blender mill, or triple roll mill.

The conductive paste of the present invention is applied to a ceramic green sheet through a printing process such as screen printing, die coating, or gravure-offset printing, and a plurality of such sheets are piled and thermocompressed to prepare a lamination. The lamination is degreased and fired to give a ceramic sintered body, and external electrodes are formed on end faces of the ceramic sintered body. In this manner, a multilayer ceramic capacitor can be produced. The present invention also encompasses such a multilayer ceramic capacitor.

The conductive paste of the present invention may be applied by any printing method, and examples of the printing method include above-mentioned printing processes such as screen printing, die coating, or gravure printing. Since the optimum viscosity depends on the printing process, the viscosity may be appropriately adjusted. In the case of screen printing, for example, the viscosity at a shear rate of 10000 $s^{-1}$ is preferably 0.5 to 1.0 Pa·s. In the case of gravure printing, the viscosity at a shear rate of 10000 $s^{-1}$ is preferably 0.05 to 0.5 Pa·s.

The conductive paste of the present invention contains the above-mentioned polyvinyl acetal resin that contains a carboxylic acid-modified polyvinyl acetal resin so as to provide a smooth printed surface even if it contains a low-polarity organic solvent. Accordingly, a thinner multilayer ceramic capacitor with excellent conductivity can be produced.

The conductive paste of the present invention contains a polyvinyl acetal resin with a very small sodium ion content, and therefore is suitably used for a silver salt binder.

The silver salt may be an organic silver salt. The organic silver salt is not particularly limited, and examples thereof include: silver salts of organic compounds having a mercapto, thione, or carboxyl group; and silver benzotriazole. Specific examples thereof include silver salts of compounds having a mercapto or thione group, 3-mercapto-4-phenyl 1,2,4-triazole silver salt, 2-mercapto-benzimidazole silver salt, 2-mercapto-5-aminothiazole silver salt, 1-phenyl-5-mercaptotetrathiazole silver salt, 2-mercaptobenzothiazole silver salt, thioglycolic acid silver salt, dithiocarboxylic acid silver salt such as dithioacetic acid silver salt, silver thioamide, thiopyridine silver salt, dithiohydroxybenzole silver salt, mercaptotriazine silver salt, mercaptooxadiazole silver salt, aliphatic carboxylic acid silver salt such as silver caprate, silver laurate, silver myristate, silver palmitate, silver stearate, silver behenate, silver maleate, silver fumarate, silver tartrate, silver furoate, silver linoleate, silver oleate, silver hydroxy stearate, silver adipate, silver sebacate, silver succinate, silver acetate, silver butyrate, and silver camphorate, aromatic silver carboxylate, silver thione carboxylate, aliphatic silver carboxylate having a thioether group, tetrazaindene silver salt, silver S-2-aminophenylthiosulfate, metal-containing amino alcohol, and organic acid metal chelate.

Advantageous Effects of Invention

The present invention can provide a conductive paste that can inhibit a sheet attack phenomenon and enables production of a thin-layer internal electrode. The present invention can further provide a conductive paste that has excellent printability, provides a smooth surface after printing, and is excellent in the storage stability and viscosity stability.

DESCRIPTION OF EMBODIMENTS

The present invention is more specifically described in the following with reference to, but not limited to, examples.

SYNTHESIS EXAMPLE 1

(Preparation of Carboxylic Acid-Modified Polyvinyl Alcohol Resin A)

Vinyl acetate (99.4 mol %) and itaconic acid (0.6 mol %) were copolymerized in the presence of a radical polymerization initiator by a common method to give a vinyl acetate copolymer. An amount of 30 parts by weight of the vinyl acetate copolymer was dissolved in 60 parts by weight of methanol. Next, the resulting solution was blended with 1 part by weight of a 45% sodium hydroxide aqueous solution and stirred for two hours, and neutralized with concentrated acetic acid. The obtained precipitate was washed with methanol to give a carboxylic acid-modified polyvinyl alcohol resin A having a structural unit represented by the formula (4). As a result of the measurement in conformity with JIS K6726, the residual acetyl content was 1.8 mol % and the average degree of polymerization was 500. As a result of the measurement by FT-IR, the carboxyl group content was 1.0 mol %.

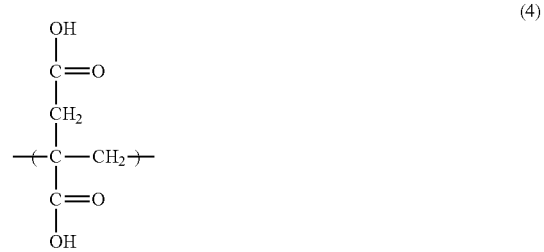

(4)

SYNTHESIS EXAMPLE 2

(Preparation of Carboxylic Acid-Modified Polyvinyl Alcohol Resin B)

Vinyl acetate (98.5 mol %) and crotonic acid (1.2 mol %) were copolymerized in the presence of a radical polymerization initiator by a common method to give a vinyl acetate copolymer. An amount of 30 parts by weight of the vinyl acetate copolymer was dissolved in 60 parts by weight of methanol. Next, the resulting solution was blended with 1 part by weight of a 45% sodium hydroxide aqueous solution and stirred for two hours, and neutralized with concentrated acetic acid. The obtained precipitate was washed with methanol to give a carboxylic acid-modified polyvinyl alcohol resin B having a structure represented by the formula (5). As a result of the measurement in conformity with JIS K6726, the residual acetyl content was 1.5 mol % and the average degree of polymerization was 500. As a result of the measurement by FT-IR, the carboxyl group content was 1.0 mol %.

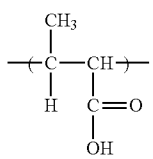

(5)

SYNTHESIS EXAMPLE 3

(Preparation of Carboxylic Acid-Modified Polyvinyl Alcohol Resin C)

Vinyl acetate (98.5 mol %) and maleic acid (0.6 mol %) were copolymerized in the presence of a radical polymerization initiator by a common method to give a vinyl acetate copolymer. An amount of 30 parts by weight of the vinyl acetate copolymer was dissolved in 60 parts by weight of methanol. Next, the resulting solution was blended with 1 part by weight of a 45% sodium hydroxide aqueous solution and stirred for two hours, and neutralized with concentrated acetic acid. The obtained precipitate was washed with methanol to give a carboxylic acid-modified polyvinyl alcohol resin C having a structural unit represented by the formula (6). As a result of the measurement in conformity with JIS K6726, the residual acetyl content was 2.0 mol % and the average degree of polymerization was 500. As a result of the measurement by FT-IR, the carboxyl group content was 1.0 mol %.

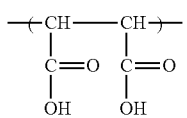

(6)

SYNTHESIS EXAMPLE 4

(Preparation of Carboxylic Acid-Modified Polyvinyl Alcohol Resin D)

Vinyl acetate (98.0 mol %) and itaconic acid (2.5 mol %) were copolymerized in the presence of a radical polymerization initiator by a common method to give a vinyl acetate copolymer. An amount of 30 parts by weight of the vinyl acetate copolymer was dissolved in 60 parts by weight of methanol. Next, the resulting solution was blended with 1 part by weight of a 45% sodium hydroxide aqueous solution and stirred for two hours, and neutralized with concentrated acetic acid. The obtained precipitate was washed with methanol to give a carboxylic acid-modified polyvinyl alcohol resin D having a structure represented by the formula (4). As a result of the measurement in conformity with JIS K6726, the residual acetyl content was 2.0 mol % and the average degree of polymerization was 500. As a result of the measurement by FT-IR, the carboxyl group content was 2.0 mol %.

SYNTHESIS EXAMPLE 5

(Preparation of Carboxylic Acid-Modified Polyvinyl Alcohol Resin L)

Vinyl acetate (99.4 mol %) and dimethyl itaconate (0.6 mol %) were copolymerized in the presence of a radical polymerization initiator by a common method to give a vinyl acetate copolymer. An amount of 30 parts by weight of the vinyl acetate copolymer was dissolved in 60 parts by weight of methanol. Next, the resulting solution was blended with 1 part by weight of a 45% sodium hydroxide aqueous solution and stirred for two hours, and neutralized with concentrated acetic acid. The obtained precipitate was washed with methanol to give a carboxylic acid-modified polyvinyl alcohol resin L having a structural unit represented by the formula (4). As a result of the measurement in conformity with JIS K6726, the residual acetyl content was 1.4 mol % and the average degree of polymerization was 500. As a result of the measurement by FT-IR, the carboxyl group content was 1.0 mol %.

EXAMPLE 1

(Preparation of Polyvinyl Acetal Resin)

An amount of 100 g of the carboxylic acid-modified polyvinyl alcohol resin A (average degree of polymerization: 500, carboxyl group content: 1.0 mol %) was added to 1000 g of pure water, and stirred at 90° C. for about two hours to be dissolved therein. The solution was cooled to 40° C. and blended with 90 g of hydrochloric acid (concentration: 35% by weight), 20 g of acetaldehyde, and 55 g of n-butyraldehyde. The resulting mixture was cooled to 10° C. and acetalized while the temperature was maintained at 10° C. After completion of the reaction, the resulting product was neutralized, washed with water, and dried to give a polyvinyl acetal resin (average degree of polymerization: 500, acetyl group content: 1.8 mol %, residual hydroxy group content: 20.5 mol %, acetoacetal group content: 23.3 mol %, butyral group content: 53.4 mol %, carboxyl group content: 1.0 mol %) in a white powder form.

(Preparation of Conductive Paste)

An amount of 10 parts by weight of the obtained polyvinyl acetal resin was dissolved in 90 parts by weight of dihydroterpinyl acetate to give a resin solution. An amount of 180 parts by weight of nickel powder as a conductive powder, 20 parts by weight of barium titanate, and 50 parts by weight of dihydroterpinyl acetate were mixed. The resulting mixture was mixed with the resin solution using a triple roll mill to achieve dispersion. In this manner, a conductive paste was prepared.

EXAMPLE 2

A polyvinyl acetal resin (average degree of polymerization: 500, acetyl group content: 1.8 mol %, residual hydroxy group content: 21.5 mol %, butyral group content: 75.7 mol %, carboxyl group content: 1.0 mol %) in a white powder form was prepared in the same manner as in Example 1, except that aldehyde used in the acetalization was changed to 80 g of n-butyraldehyde.

A conductive paste was prepared in the same manner as in Example 1 using the obtained polyvinyl acetal resin.

EXAMPLE 3

A polyvinyl acetal resin (average degree of polymerization: 740, acetyl group content: 2.0 mol %, residual hydroxy group content: 20.3 mol %, acetoacetal group content: 23.5 mol %, butyral group content: 54.0 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A (average degree of polymerization: 500, carboxyl group content: 1.0 mol %) and 80 g of an unmodified polyvinyl alcohol resin E (average degree of polymerization: 800, acetyl group content: 2.0 mol %) were used.

Using the obtained polyvinyl acetal resin, a conductive paste was prepared in the same manner as in Example 1.

EXAMPLE 4

A polyvinyl acetal resin (average degree of polymerization: 260, acetyl group content: 1.6 mol %, residual hydroxy group content: 20.7 mol %, acetoacetal group content: 23.2 mol %, butyral group content: 54.3 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A (average degree of polymerization: 500, carboxyl group content 1.0 mol %) and 80 g of an unmodified polyvinyl alcohol resin F (average degree of polymerization: 200, acetyl group content: 1.5 mol %) were used.

Using the obtained polyvinyl acetal resin, a conductive paste was prepared in the same manner as in Example 1.

EXAMPLE 5

A polyvinyl acetal resin (average degree of polymerization: 260, acetyl group content: 1.6 mol %, residual hydroxy group content: 20.5 mol %, acetoacetal group content: 23.7 mol %, butyral group content: 54.0 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin B (average degree of polymerization: 500, carboxyl group content: 1.0 mol %) and 80 g of an unmodified polyvinyl alcohol resin F (average degree of polymerization: 200, acetyl group content: 1.5 mol %) were used.

Using the obtained polyvinyl acetal resin, a conductive paste was prepared in the same manner as in Example 1.

EXAMPLE 6

A polyvinyl acetal resin (average degree of polymerization: 500, acetyl group content: 3.0 mol %, residual hydroxy group content: 19.6 mol %, acetoacetal group content: 23.8 mol %, butyral group content: 53.4 mol %, carboxyl group content 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A (average degree of polymerization: 500, carboxyl group content: 1.0 mol %) and 80 g of an unmodified polyvinyl alcohol resin G (average degree of polymerization: 500, acetyl group content: 3.5 mol %) were used.

Using the obtained polyvinyl acetal resin, a conductive paste was prepared in the same manner as in Example 1.

EXAMPLE 7

A polyvinyl acetal resin (average degree of polymerization: 500, acetyl group content: 1.8 mol %, residual hydroxy group content: 21.1 mol %, acetoacetal group content: 22.6 mol %, butyral group content: 54.4 mol %, carboxyl group content: 0.06 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 6 g of the carboxylic acid-modified polyvinyl alcohol resin A (average degree of polymerization: 500, carboxyl group content: 1.0 mol %) and 94 g of an unmodified polyvinyl alcohol resin H (average degree of polymerization: 500, acetyl group content: 1.8 mol %) were used.

Using the obtained polyvinyl acetal resin, a conductive paste was prepared in the same manner as in Example 1.

EXAMPLE 8

A polyvinyl acetal resin (average degree of polymerization: 500, acetyl group content: 0.2 mol %, residual hydroxy group content: 19.8 mol %, acetoacetal group content: 22.8 mol %, butyral group content: 57.1 mol %, carboxyl group content: 0.06 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 6 g of the carboxylic acid-modified polyvinyl alcohol resin A (average degree of polymerization: 500, carboxyl group content: 1.0 mol %) and 94 g of an unmodified polyvinyl alcohol resin I (average degree of polymerization: 500, acetyl group content: 0.1 mol %) were used.

Using the obtained polyvinyl acetal resin, a conductive paste was prepared in the same manner as in Example 1.

EXAMPLE 9

A polyvinyl acetal resin (average degree of polymerization: 500, acetyl group content: 1.0 mol %, residual hydroxy group content: 20.1 mol %, acetoacetal group content: 20.2 mol %, butyral group content: 57.3 mol %, carboxyl group content: 1.00 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 100 g of the carboxylic acid-modified polyvinyl alcohol resin L (average degree of polymerization: 500, carboxyl group content: 1.0 mol %) was used.

Using the obtained polyvinyl acetal resin, a conductive paste was prepared in the same manner as in Example 1.

EXAMPLE 10

A polyvinyl acetal resin (average degree of polymerization: 500, acetyl group content: 1.7 mol %, residual hydroxy group content: 19.5 mol %, acetoacetal group content: 21.5 mol %, butyral group content: 57.1 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin L (average degree of polymerization: 500, carboxyl group content: 1.0 mol %) and 80 g of an unmodified polyvinyl alcohol resin H (average degree of polymerization: 500, acetyl group content: 1.8 mol %) were used.

Using the obtained polyvinyl acetal resin, a conductive paste was prepared in the same manner as in Example 1.

EXAMPLE 11

A polyvinyl acetal resin (average degree of polymerization: 500, acetyl group content: 1.8 mol %, residual hydroxy group content: 18.2 mol %, acetoacetal group content: 13.8 mol %, butyral group content: 66.0 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A and 80 g of the unmodified polyvinyl alcohol resin H (average degree of polymerization: 500, acetyl group content: 1.8 mol %) were used and that the aldehyde used in the reaction was changed to 15 g of acetaldehyde and 70 g of n-butyraldehyde.

Using the obtained polyvinyl acetal resin, a conductive paste was prepared in the same manner as in Example 1.

EXAMPLE 12

A polyvinyl acetal resin (average degree of polymerization: 500, acetyl group content: 1.8 mol %, residual hydroxy group content: 22.8 mol %, acetoacetal group content: 10.5 mol %, butyral group content: 64.7 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A and 80 g of the unmodified polyvinyl alcohol resin H (average degree of polymerization: 500, acetyl group content: 1.8 mol %) were used and that the aldehyde used in the reaction was changed to 12 g of acetaldehyde and 63 g of n-butyraldehyde.

Using the obtained polyvinyl acetal resin, a conductive paste was prepared in the same manner as in Example 1.

EXAMPLE 13

A polyvinyl acetal resin (average degree of polymerization: 500, acetyl group content: 1.8 mol %, residual hydroxy group content: 22.5 mol %, butyral group content: 74.7 mol %, carboxyl group content: 1.0 mol %) in a white powder form was prepared in the same manner as in Example 2, except that, instead of 100 g of the carboxylic acid-modified polyvinyl alcohol resin A (average degree of polymerization: 500, carboxyl group content: 1.0 mol %), 100 g of the carboxylic acid-modified polyvinyl alcohol resin L (average degree of polymerization: 500, carboxyl group content: 1.0 mol %) was used.

Using the obtained polyvinyl acetal resin, a conductive paste was prepared in the same manner as in Example 1.

EXAMPLE 14

A polyvinyl acetal resin (average degree of polymerization: 740, acetyl group content: 1.9 mol %, residual hydroxy group content: 20.8 mol %, acetoacetal group content: 15.5 mol %, butyral group content: 61.6 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin L (average degree of polymerization: 500, carboxyl group content: 1.0 mol %) and 80 g of the unmodified polyvinyl alcohol resin E (average degree of polymerization: 800, acetyl group content: 2.0 mol %) were used and that the aldehyde used in the reaction was changed to 18 g of acetaldehyde and 70 g of n-butyraldehyde.

Using the obtained polyvinyl acetal resin, a conductive paste was prepared in the same manner as in Example 1.

EXAMPLE 15

A polyvinyl acetal resin (average degree of polymerization: 260, acetyl group content: 1.5 mol %, residual hydroxy group content: 20.8 mol %, acetoacetal group content: 11.8 mol %, butyral group content: 65.7 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin L (average degree of polymerization: 500, carboxyl group content: 1.5 mol %) and 80 g of the unmodified polyvinyl alcohol resin F (average degree of polymerization: 200, acetyl group content: 1.5 mol %) were used and that the aldehyde used in the reaction was changed to 13 g of acetaldehyde and 63 g of n-butyraldehyde.

Using the obtained polyvinyl acetal resin, a conductive paste was prepared in the same manner as in Example 1.

EXAMPLE 16

A polyvinyl acetal resin (average degree of polymerization: 500, acetyl group content: 1.8 mol %, residual hydroxy group content: 21.2 mol %, acetoacetal group content: 23.6 mol %, butyral group content: 53.3 mol %, carboxyl group content: 0.06 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 6 g of the carboxylic acid-modified polyvinyl alcohol resin L (average degree of polymerization: 500, carboxyl group content: 1.0 mol %) and 94 g of the unmodified polyvinyl alcohol resin H (average degree of polymerization: 500, acetyl group content: 1.8 mol %) were used.

Using the obtained polyvinyl acetal resin, a conductive paste was prepared in the same manner as in Example 1.

EXAMPLE 17

A polyvinyl acetal resin (average degree of polymerization: 500, acetyl group content: 0.2 mol %, residual hydroxy group content: 20.0 mol %, acetoacetal group content: 21.8 mol %, butyral group content: 57.9 mol %, carboxyl group content: 0.06 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 6 g of the carboxylic acid-modified polyvinyl alcohol resin L (average degree of polymerization: 500, carboxyl group content: 1.0 mol %) and 94 g of an unmodified polyvinyl alcohol resin I (average degree of polymerization: 500, acetyl group content: 0.1 mol %) were used.

Using the obtained polyvinyl acetal resin, a conductive paste was prepared in the same manner as in Example 1.

COMPARATIVE EXAMPLE 1

A polyvinyl acetal resin (average degree of polymerization: 500, acetyl group content: 1.8 mol %, residual hydroxy group content: 22.0 mol %, acetoacetal group content: 32.6 mol %, butyral group content: 42.6 mol %, carboxyl group content: 1.0 mol %) in a white powder form was prepared in the same manner as in Example 1, except that the aldehyde used in the acetalization was changed to 33 g of acetaldehyde and 47 g of n-butyraldehyde.

Using the obtained polyvinyl acetal resin, a conductive paste was prepared in the same manner as in Example 1.

COMPARATIVE EXAMPLE 2

A polyvinyl acetal resin (average degree of polymerization: 1700, acetyl group content: 2.0 mol %, residual hydroxy group content: 21.2 mol %, acetoacetal group content: 23.1 mol %, butyral group content: 53.5 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A (average degree of polymerization: 500, carboxyl group content: 1.0 mol %) and 80 g of an unmodified polyvinyl alcohol resin J (average degree of polymerization: 2000, acetyl group content: 2.0 mol %) were used.

Using the obtained polyvinyl acetal resin, a conductive paste was prepared in the same manner as in Example 1.

COMPARATIVE EXAMPLE 3

A polyvinyl acetal resin (average degree of polymerization: 500, acetyl group content: 2.0 mol %, residual hydroxy group content: 20.2 mol %, acetoacetal group content: 23.8 mol %, butyral group content: 53.0 mol %, carboxyl group content: 1.0 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 100 g of the carboxylic acid-modified polyvinyl alcohol resin C (average degree of polymerization: 500, carboxyl group content: 1.0 mol %) was used.

Using the obtained polyvinyl acetal resin, a conductive paste was prepared in the same manner as in Example 1.

COMPARATIVE EXAMPLE 4

A polyvinyl acetal resin (average degree of polymerization: 500, acetyl group content: 1.8 mol %, residual hydroxy group content: 28.0 mol %, acetoacetal group content: 17.5 mol %, butyral group content: 51.7 mol %, carboxyl group content: 1.0 mol %) in a white powder form was prepared in the same manner as in Example 1, except that the aldehyde used in the acetalization was changed to 18 g of acetaldehyde and 50 g of n-butyraldehyde.

Using the obtained polyvinyl acetal resin, a conductive paste was prepared in the same manner as in Example 1.

COMPARATIVE EXAMPLE 5

A polyvinyl acetal resin (average degree of polymerization: 500, acetyl group content: 4.4 mol %, residual hydroxy group content: 22.0 mol %, acetoacetal group content: 22.8 mol %, butyral group content: 50.6 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A (average degree of polymerization: 500, carboxyl group content: 1.0 mol %) and 80 g of an unmodified polyvinyl alcohol resin K (average degree of polymerization: 500, acetyl group content: 5.0 mol %) were used.

Using the obtained polyvinyl acetal resin, a conductive paste was prepared in the same manner as in Example 1.

COMPARATIVE EXAMPLE 6

A polyvinyl acetal resin (average degree of polymerization: 500, acetyl group content: 2.0 mol %, residual hydroxy group content: 21.5 mol %, acetoacetal group content: 21.6 mol %, butyral group content: 52.9 mol %, carboxyl group content: 2.0 mol %) was prepared in the same manner as in Example 1, except that, instead of 100 g of the carboxylic acid-modified polyvinyl alcohol resin A (average degree of polymerization: 500, carboxyl group content: 1.0 mol %), 100 g of the carboxylic acid-modified polyvinyl alcohol resin D (average degree of polymerization: 500, carboxyl group content: 2.0 mol %) obtained in Synthesis Example 4 was used.

Using the obtained polyvinyl acetal resin, a conductive paste was prepared in the same manner as in Example 1.

COMPARATIVE EXAMPLE 7

A polyvinyl acetal resin (average degree of polymerization: 500, acetyl group content: 1.8 mol %, residual hydroxy group content: 22.3 mol %, acetoacetal group content: 22.1 mol %, butyral group content: 53.8 mol %, carboxyl group content: 0.0 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 100 g of the unmodified polyvinyl alcohol resin H (average degree of polymerization: 500, acetyl group content: 1.8 mol %) was used.

Using the obtained polyvinyl acetal resin, a conductive paste was prepared in the same manner as in Example 1.

COMPARATIVE EXAMPLE 8

A polyvinyl acetal resin (average degree of polymerization: 170, acetyl group content: 2.2 mol %, residual hydroxy group content: 20.5 mol %, acetoacetal group content: 15.5 mol %, butyral group content: 61.7 mol %, carboxyl group content: 0.06 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %, 6 g of the carboxylic acid-modified polyvinyl alcohol resin A and 94 g of an unmodified polyvinyl alcohol resin M (average degree of polymerization: 150, acetyl group content: 2.2 mol %) were used and that the aldehyde used in the reaction was changed to 18 g of acetaldehyde and 65 g of n-butyraldehyde.

Using the obtained polyvinyl acetal resin, a conductive paste was prepared in the same manner as in Example 1.

COMPARATIVE EXAMPLE 9

A polyvinyl acetal resin (average degree of polymerization: 900, acetyl group content: 2.4 mol %, residual hydroxy group content: 19.8 mol %, acetoacetal group content: 12.5 mol %, butyral group content: 65.1 mol %, carboxyl group content: 0.2 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 20 g of the carboxylic acid-modified polyvinyl alcohol resin A and 80 g of an unmodified polyvinyl alcohol resin N (average degree of polymerization: 1000, acetyl group content: 2.5 mol %) were used and that the aldehyde used in the reaction was changed to 15 g of acetaldehyde and 70 g of n-butyraldehyde.

Using the obtained polyvinyl acetal resin, a conductive paste was prepared in the same manner as in Example 1.

COMPARATIVE EXAMPLE 10

A polyvinyl acetal resin (average degree of polymerization: 800, acetyl group content: 2.0 mol %, residual hydroxy group content: 18.5 mol %, acetoacetal group content: 19.2 mol %, butyral group content: 60.3 mol %, carboxyl group content: 0.02 mol %) in a white powder form was prepared in the same manner as in Example 1, except that, instead of 100 g of the carboxylic acid-modified polyvinyl alcohol resin A (average degree of polymerization: 500, carboxyl group content: 1.0 mol %), 2 g of the carboxylic acid-modified polyvinyl alcohol resin A and 98 g of the unmodified polyvinyl alcohol resin E (average degree of polymerization: 800, acetyl group content: 2.0 mol %) were used and that the aldehyde used in the reaction was changed to 24 g of acetaldehyde and 70 g of butyraldehyde.

Using the obtained polyvinyl acetal resin, a conductive paste was prepared in the same manner as in Example 1.

<Evaluation>

The polyvinyl acetal resins and conductive pastes obtained in Examples 1 to 17 and Comparative Examples 1 to 10 were subjected to the following evaluation. Table 1 shows the results.

TABLE 1

| | Raw material polyvinyl alcohol | | | | Properties of polyvinyl acetal resin | | | | | | | | Evaluation on resin | | | Evaluation on conductive paste | | | |
|---|---|---|---|---|---|---|---|---|---|---|---|---|---|---|---|---|---|---|---|
| | Carboxylic acid-modified polyvinyl alcohol | | Unmodified polyvinyl alcohol | | Average degree of polymer-ization | Carboxyl group content (mol %) | Hydroxy group content (mol %) | Acetyl group content (mol %) | Acetyl group content/ Hydroxy group content | Aceto-acetal group content (mol %) | Butyral group content (mol %) | Solubility | | Na ion content (ppm) | Printability | Surface roughness | Storage stability | Viscosity stability |
| | Kind | Amount (g) | Kind | Amount (g) | | | | | | | | Haze value | Judgement | | | | | |
| Example 1 | A | 100 | — | — | 500 | 1.0 | 20.5 | 1.8 | 0.088 | 23.3 | 53.4 | 7.1 | ○ | 200 | 0 failure | 0.105 | ○ | △ |
| Example 2 | A | 100 | — | — | 500 | 1.0 | 21.5 | 1.8 | 0.084 | — | 75.7 | 6.2 | ○ | 200 | 0 failure | 0.097 | ○ | △ |
| Example 3 | A | 20 | E | 80 | 740 | 0.2 | 20.3 | 2 | 0.099 | 23.5 | 54.0 | 7.5 | ○ | 90 | 0 failure | 0.118 | ○ | △ |
| Example 4 | A | 20 | F | 80 | 260 | 0.2 | 20.7 | 1.6 | 0.077 | 23.2 | 54.3 | 4.5 | ○ | 90 | 0 failure | 0.063 | ○ | ○ |
| Example 5 | A | 20 | F | 80 | 260 | 0.2 | 20.5 | 1.6 | 0.078 | 23.7 | 54.0 | 3.8 | ○ | 60 | 0 failure | 0.086 | ○ | ○ |
| Example 6 | B | 20 | G | 80 | 500 | 0.2 | 19.6 | 3 | 0.153 | 23.8 | 53.4 | 9.8 | △ | 120 | 1 failure | 0.135 | △ | ○ |
| Example 7 | A | 6 | H | 94 | 500 | 0.06 | 21.1 | 1.8 | 0.085 | 22.6 | 54.1 | 5.0 | ○ | 60 | 0 failure | 0.092 | △ | ○ |
| Example 8 | A | 6 | I | 94 | 500 | 0.06 | 19.8 | 0.2 | 0.010 | 22.8 | 57.1 | 4.0 | ○ | 60 | 0 failure | 0.079 | △ | ○ |
| Example 9 | L | 100 | — | — | 500 | 1.00 | 20.1 | 1.4 | 0.070 | 20.2 | 57.3 | 3.8 | ○ | 40 | 0 failure | 0.05 | △ | ○○ |
| Example 10 | L | 20 | H | 80 | 500 | 0.20 | 19.5 | 1.7 | 0.087 | 21.5 | 57.1 | 3.5 | ○ | 30 | 0 failure | 0.048 | ○ | ○○ |
| Example 11 | L | 20 | H | 80 | 500 | 0.20 | 18.2 | 1.8 | 0.099 | 13.8 | 66.0 | 5.2 | ○ | 90 | 0 failure | 0.072 | ○ | ○○ |
| Example 12 | L | 20 | H | 80 | 500 | 0.20 | 22.8 | 1.8 | 0.079 | 10.5 | 64.7 | 6.5 | ○ | 80 | 0 failure | 0.085 | ○ | ○○ |
| Example 13 | L | 100 | — | — | 500 | 1.0 | 22.5 | 1.8 | 0.080 | — | 74.7 | 4.0 | ○ | 40 | 0 failure | 0.05 | ○ | ○○ |
| Example 14 | L | 20 | E | 80 | 740 | 0.2 | 20.8 | 1.9 | 0.091 | 15.5 | 61.6 | 3.5 | ○ | 30 | 0 failure | 0.045 | ○○ | ○○ |
| Example 15 | L | 20 | F | 80 | 260 | 0.2 | 20.8 | 1.5 | 0.072 | 11.8 | 65.7 | 2.8 | ○ | 30 | 0 failure | 0.047 | ○○ | ○○ |
| Example 16 | L | 6 | H | 94 | 500 | 0.06 | 21.2 | 1.8 | 0.085 | 23.6 | 53.3 | 3.3 | ○ | 20 | 0 failure | 0.046 | ○○ | ○○ |
| Example 17 | L | 6 | I | 94 | 500 | 0.06 | 20 | 0.2 | 0.010 | 21.8 | 57.9 | 2.8 | ○ | 20 | 0 failure | 0.043 | ○○ | ○○ |
| Comparative Example 1 | A | 100 | — | — | 500 | 1.0 | 22 | 1.8 | 0.082 | 32.6 | 42.6 | 18.2 | × | 200 | Not printable 10 or more failures | — | — | × |
| Comparative Example 2 | A | 20 | J | 80 | 1700 | 0.2 | 21.2 | 2 | 0.094 | 23.1 | 53.5 | 10.1 | △ | 90 | × | 0.503 | ○ | △ |
| Comparative Example 3 | C | 100 | — | — | 500 | 1.0 | 20.2 | 2 | 0.099 | 23.8 | 53.0 | 83.5 | × | 240 | Not printable | × | — | × |
| Comparative Example 4 | A | 100 | — | — | 500 | 1.0 | 28.0 | 1.8 | 0.064 | 17.5 | 51.7 | 54.4 | × | 200 | × | — | — | × |
| Comparative Example 5 | A | 20 | K | 80 | 500 | 0.2 | 22 | 4.4 | 0.200 | 22.8 | 50.6 | 22.8 | × | 120 | Not printable | — | — | × |
| Comparative Example 6 | D | 100 | — | — | 500 | 2.0 | 21.5 | 2 | 0.093 | 21.6 | 52.9 | 14.8 | △ | 240 | 1 failure | 0.476 | × Gelled | × |
| Comparative Example 7 | — | — | H | 100 | 500 | 0.0 | 22.3 | 1.8 | 0.081 | 22.1 | 53.8 | 5.5 | ○ | 30 | 0 failure | 0.128 | × Precipitated | × |
| Comparative Example 8 | A | 6 | M | 94 | 170 | 0.06 | 20.5 | 2.2 | 0.107 | 15.5 | 61.7 | 3.1 | ○ | 60 | 0 failure | 0.069 | × Precipitated | × |
| Comparative Example 9 | A | 20 | N | 80 | 900 | 0.2 | 19.8 | 2.4 | 0.121 | 12.5 | 65.1 | 8.7 | ○ | 90 | 0 failure | 0.178 | ○ | △ |
| Comparative Example 10 | A | 2 | E | 98 | 800 | 0.02 | 18.5 | 2 | 0.108 | 19.2 | 60.3 | 6 | ○ | 50 | 0 failure | 0.109 | × Precipitated | × |

(1) Solubility of Resin in Solvent

An amount of 10 parts by weight of each of the polyvinyl acetal resins obtained in Examples 1 to 17 and Comparative Examples 1 to 10 was dissolved in 90 parts by weight of dihydroterpinyl acetate, and the haze value of the obtained solution was measured with a haze meter and evaluated based on the following criteria.

Good (o): Haze value of less than 8.0.

Acceptable (Δ): Haze value of 8.0 or more but less than 15.0.

Poor (x): Haze value of 15.0 or more.

(2) Na Ion Content

The amount of Na ions in each of the polyvinyl acetal resins obtained in Examples 1 to 17 and Comparative Examples 1 to 10 was measured with an atomic absorption spectrophotometer. After formation of a calibration curve, an appropriate amount of a sample solution was taken for measurement of the absorbance, and the Na ion content was determined based on the calibration curve.

(3) Printability

Each conductive paste was used for printing at a temperature of 23° C. and a humidity of 50% using a screen printer (MT-320TV, Microtek Inc.), a screen plate (Tokyo Process Service Co., Ltd., ST500, emulsion: 2 μm, 2012 pattern, screen frame: 320 mm×320 mm), and a printing glass substrate (soda glass, 150 mm×150 mm, thickness: 1.5 mm). The solvent was dried in a ventilation oven at a temperature of 100° C. for 30 minutes. The printed pattern was observed visually or under a magnification microscope. The end shape of the printed face was observed and evaluated based on the following criteria.

Good (o): Printed according to the printing pattern and no thread-like print failure was observed at the printing end.

Acceptable (Δ): Printed according to the printing pattern but one thread-like print failure was observed at the printing end.

Poor (x): Not printed according to the printing pattern or two or more thread-like print failures was observed at the printing end.

(4) Surface Roughness

Using the printed pattern of the conductive paste obtained in "(3) Printability", the surface roughness was measured at 10 sites with a surface roughness meter (Surfcom, Tokyo Seimitsu Co., Ltd.) and evaluated based on the following criteria.

Excellent (oo): The average surface roughness Ra of 10 measured sites was less than 0.060 μm.

Good (o): The average surface roughness Ra of 10 measured sites was 0.060 μm or more but less than 0.125 μm.

Acceptable (Δ): The average surface roughness Ra of 10 measured sites was 0.125 μm or more but less than 0.150 μm.

Poor (x): The average surface roughness Ra of 10 measured sites was 0.150 μm or more.

(5) Storage Stability

The conductive pastes obtained in Examples 1 to 17 and Comparative Examples 1 to 10 were each stored in an environment at a temperature of 23° C. and a humidity of 50%. The state of the conductive paste after a month was observed and evaluated based on the following criteria.

Good (o): Separation of the paste or precipitation of the inorganic powder was not observed and the paste was smooth.

Acceptable (Δ): Precipitation of the inorganic powder was not observed but separation of the paste was observed.

Poor (x): Precipitation of the inorganic powder was observed or the paste was gelled.

(6) Viscosity Stability

The initial viscosity of each of the conductive pastes obtained in Examples 1 to 17 and Comparative Examples 1 to 10 at 20° C. was measured with a Brookfield-type rotary viscometer.

The conductive pastes after the measurement were stored in a thermostatic chamber at 20° C. for a month. The viscosity after storage at 20° C. was measured with a Brookfield-type rotary viscometer. The change rate between the initial viscosity and the viscosity after storage was determined using the following equation (7). The determined change rate was evaluated based on the following criteria.

$$\text{Rate (\%) of viscosity change} = ((E-F)/F) \times 100 \tag{7}$$

In the equation (7), E represents the viscosity after storage and F represents the initial viscosity.

Excellent (oo): Less than 5%.

Good (o): 5% or more but less than 10%.

Acceptable (Δ): 10% or more but less than 20%.

Poor (x): 20% or more.

INDUSTRIAL APPLICABILITY

The present invention can provide a conductive paste that can inhibit a sheet attack phenomenon and enables production of a thin-layer internal electrode. Moreover, the present invention can provide a conductive paste which has excellent printability, which provides smooth printed surface, and which is excellent in the storage stability and viscosity stability.

The invention claimed is:

1. A conductive paste used for formation of an electrode of a multilayer ceramic capacitor, the conductive paste comprising:

a polyvinyl acetal resin that contains a carboxylic acid-modified polyvinyl acetal resin;

an organic solvent; and a conductive powder, the polyvinyl acetal resin having an average degree of polymerization of 200 to 800, a carboxyl group content of 0.05 to 1 mol %, a hydroxy group content of 16 to 24 mol %, an acetyl group content of 0.1 to 3 mol %, and an acetoacetal group content of not more than 25 mol %, the carboxylic acid-modified polyvinyl acetal resin having at least one of a structural unit that has a carboxyl group represented by the formula (1-1) and a structural unit that has a carboxyl group represented by the formula (1-2):

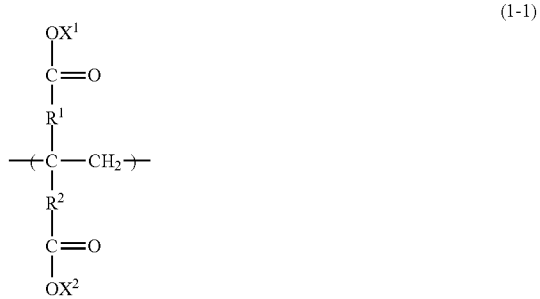

-continued (1-2)

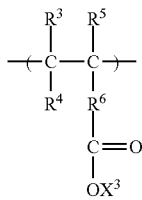

in the formula (1-1), $R^1$ and $R^2$ each independently represent a C0-C10 alkylene group, $X^1$ and $X^2$ each independently represent a hydrogen atom, a metal atom, or a methyl group, in the formula (1-2), $R^3$, $R^4$, and $R^5$ each independently represent a hydrogen atom or a C1-C10 alkyl group, $R^6$ represents a C0-C10 alkylene group, $X^3$ represents a hydrogen atom, a metal atom, or a methyl group, wherein C0 represents carbons adjacent to $R^1$, $R^2$, or $R^6$ being directly bonded to each other, wherein the polyvinyl acetal resin has a ratio of the acetyl group content to the hydroxy group content of 0.07 to 0.15.

2. The conductive paste according to claim 1, wherein the conductive powder comprises nickel.

3. The conductive paste according to claim 1, further comprising a ceramic powder.

4. The conductive paste according to claim 1, wherein the organic solvent has a solubility parameter of 8.0 to 11.0 $(cal/cm^3)^{0.5}$.

5. The conductive paste according to claim 1, wherein the polyvinyl acetal resin has a sodium ion content of less than 50 ppm.

6. A multilayer ceramic capacitor produced using the conductive paste according to claim 1.

* * * * *